No. 649,614. Patented May 15, 1900.
A. E. PEYRUSSON.
APPARATUS FOR ELECTROLYSIS.
(Application filed May 15, 1896.)
(No Model.)

Witnesses:
Charles Henry Clarke.
Herbert N. Graham.

Inventor,
Antoine E. Peyrusson,
by Geo. H. Graham
Assoc. Atty.

THE NORRIS PETERS CO., PHOTO-LITHO., WASHINGTON, D. C.

United States Patent Office.

ANTOINE EDOUARD PEYRUSSON, OF LIMOGES, FRANCE.

APPARATUS FOR ELECTROLYSIS.

SPECIFICATION forming part of Letters Patent No. 649,614, dated May 15, 1900.

Application filed May 15, 1896. Serial No. 591,738. (No model.)

*To all whom it may concern:*

Be it known that I, ANTOINE EDOUARD PEYRUSSON, a citizen of France, residing at Limoges, in the department of Haute-Vienne, Republic of France, have invented certain new and useful Improvements in Apparatus for Electrolysis; and I do hereby declare the following to be a full, clear, and exact description of the same, reference being had to the accompanying drawings, forming a part thereof.

The present invention has for its object to provide an apparatus by which electrolytic processes may be carried out in an improved manner; and it consists, mainly, in employing electrodes of helical form and separated by porous partitions.

Figure 1:
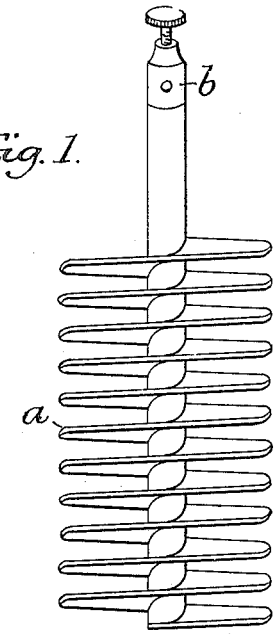
Figure 2:
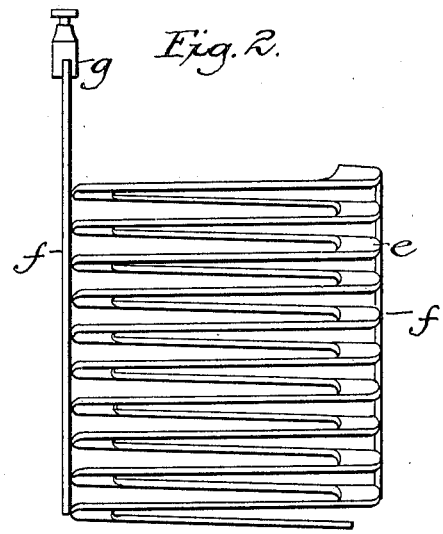
Figure 3:
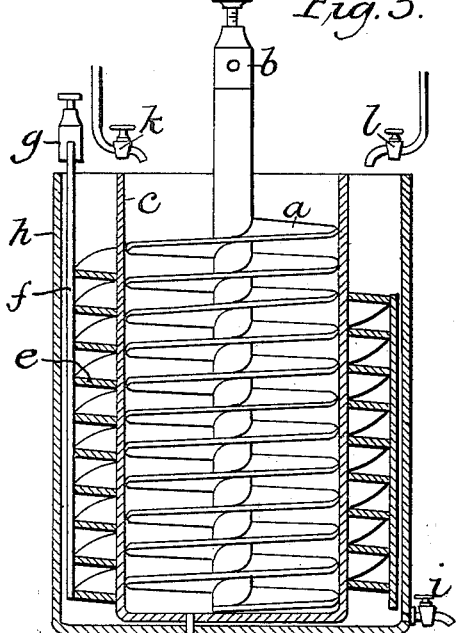
Figure 4:
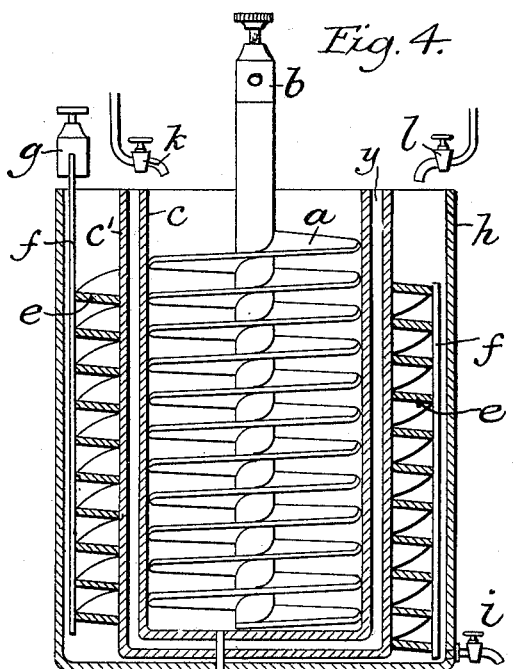

In the accompanying drawings, which illustrate a form of the improved apparatus, Figure 1 represents an elevation of the internal electrode. Fig. 2 is a view of the external electrode in elevation. Fig. 3 is a vertical section of the whole apparatus. Fig. 4 represents a modification of the apparatus.

Figs. 1, 3, and 4 show the interior electrode $a$, made in a helical form, with convolutions near enough together to allow the electrolyte to be gradually and completely submitted to the action of the current as it flows toward the bottom of the apparatus. This electrode, receiving the current at $b$, is placed inside a porous receptacle $c$ of the same diameter internally as the electrode. This porous receptacle communicates at its lower part with a faucet $d$, so as to permit the electrolyte to be drawn off. The external electrode $e$ of the apparatus is also helical, but hollow in the center, within which is fitted the porous receptacle $c$, containing the internal electrode. The convolutions of this helical electrode $e$ are bound by exterior rods $f$, one of which receives the current at $g$. In place of the rods $f$ the helix that forms the external electrode may have other binding means. Both electrodes and the porous receptacle are placed in another receptacle $h$, made of pottery, china, glass, wood, or metal that is insulated. This receptacle is also supplied at the lower part with a faucet $i$, regulating the outflow of the electrolyte submitted to the action of the exterior electrode $e$. By referring to Fig. 3 this will be easily understood.

The operation of this apparatus is as follows: The faucets $k$ and $l$, communicating with the feeding-reservoirs, being properly opened, the solutions to be electrolyzed enter into the apparatus, pass through it in following the convolutions of the electrodes, and pass out at the lower part by the faucets $d$ and $i$. This helicoidal form of the electrodes has the great advantage of compelling the electrolytes to follow the revolution of the convolutions, and consequently to make a circuit of the apparatus, the speed of the downward flow of the electrolyte being regulated according to the pitch of the helix, so that the distance traveled by the electrolyte may be as much as one hundred times greater than the length of the vertical axis of the helix. Further, during this long circuit the electrolyte is subjected to the electric current in the form of thin layers confined between the blades of the helix and is consequently in the best condition for treatment. This result is still further assisted by the movement of the liquid and by the fact that every part of the electrolyte submitted to the current during the circuit of the helix is isolated from the rest of the mass and discharged as soon as the desired effect is attained. In order to arrive at this result, it is only necessary to regulate the efflux in a suitable manner by means of the faucets $d$ and $i$. These electrodes may be made of any conductive material whose nature will vary according to the composition of the electrolyte. With this form of apparatus the reactions produced by each electrode may be readily utilized, and even two different electrolytes may be simultaneously treated. For example, a neutral sulfate at the anode and a sulfuric acid at the cathode may both be transformed into a bisulfate. In this case the following reaction occurs: $Na_2SO_4$ (at anode) $H_2SO_4$ (at cathode) $= 2NaHSO_4$.

In many cases I have found that by this apparatus the products of electrolysis may be obtained much purer than before.

It is preferred to separate the electrodes by two porous walls $c$ and $c'$, thus forming the inner porous receptacle with a double wall or partition, (see Fig. 4,) so as to leave a space $y$, in which the mixture of the anions and cations will be formed. If, for example, it is desired to obtain a product very pure at the cathode, the liquid under treatment must be circulated in the space between the porous partitions, and it is in this part that the ions coming from the anode will diffuse themselves, the mixture being taken out as it is formed, while the cathode remains free from all mixture. The space between the porous walls may be filled with a conductive liquid of an appropriate nature to neutralize the anions or the cations that may be prejudicial to the process.

The electrolytic apparatus above described, owing to its helical electrodes and the manner in which the electrolyte is circulated and controlled, is eminently suitable for carrying out various known electrolytic processes. Thus, by the action of electrolytic decomposition, oxygen, chlorin, bromin, iodin, and all the electronegative elements and radicals will be drawn toward the anode, or while they are in the "nascent" state they may be used to oxidize or chlorinate or the like and to combine with various substances—as, for example, sluice or sewer water can be disinfected, paper-pulp bleached, and the like by making them circulate at the anode with a small quantity of sea-salt or even by putting the salt at the cathode. At the cathode, on the contrary, hydrogen, alkalies, or other electropositive elements may be obtained and various reactions produced. All these effects are given merely as examples of electrolysis, it being impossible to mention all electrolytic reactions which are known and which may be employed in this apparatus. Either direct or alternate currents may be employed.

What is claimed is—

1. In an electrolytic apparatus, the combination of an outer receptacle, an inner porous receptacle, a helical electrode in each receptacle having convolutions forming with the porous walls of the inner receptacle, a channel for the electrolyte continuously exposed both to the porous partition and the electrode and independent inlet and outlets to each receptacle, as described.

2. In an electrolytic apparatus the combination of an outer receptacle, a double-walled porous receptacle, and a helical electrode in each receptacle having convolutions forming with the porous walls of the inner receptacle a channel for the electrolyte, as described.

In testimony whereof I affix my signature in presence of two witnesses.

ANTOINE EDOUARD PEYRUSSON.

Witnesses:
G. GONTERON,
L. LOYUDIE.